(12) United States Patent
Xu et al.

(10) Patent No.: US 8,105,724 B2
(45) Date of Patent: Jan. 31, 2012

(54) METHOD FOR CONTROLLING FUEL CELL STACK CURRENT

(75) Inventors: Jack Xu, Northville, MI (US); Ramakrishna Raju, West Bloomfield, MI (US); Matt DeDona, Northville, MI (US); Raymond Spiteri, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1145 days.

(21) Appl. No.: 11/341,215

(22) Filed: Jan. 28, 2006

(65) Prior Publication Data

US 2007/0178336 A1 Aug. 2, 2007

(51) Int. Cl.
*H01M 8/04* (2006.01)
(52) U.S. Cl. ....................................................... 429/431
(58) Field of Classification Search .................... 429/23, 429/13, 430, 431, 432
See application file for complete search history.

(56) References Cited

U.S. PATENT DOCUMENTS

| | | | |
|---|---|---|---|
| 6,379,826 B1* | 4/2002 | Lacy | 429/432 |
| 6,428,917 B1* | 8/2002 | Lacy et al. | 429/13 |
| 6,580,977 B2 | 6/2003 | Ding et al. | |
| 6,680,592 B2 | 1/2004 | Blum | |
| 6,684,135 B2 | 1/2004 | Uenodai et al. | |
| 6,792,341 B2 | 9/2004 | Hunt et al. | |
| 6,795,756 B1 | 9/2004 | Zhang et al. | |
| 2002/0102447 A1* | 8/2002 | Kato | 429/23 |
| 2003/0113599 A1 | 6/2003 | Pearson | |
| 2004/0076860 A1 | 4/2004 | Aso | |
| 2004/0115487 A1 | 6/2004 | Ichinose et al. | |
| 2004/0146764 A1* | 7/2004 | Tsai et al. | 429/27 |

FOREIGN PATENT DOCUMENTS

| | | |
|---|---|---|
| JP | 2004-187332 A | 7/2004 |
| WO | WO 2006040657 A2 * | 4/2006 |

* cited by examiner

*Primary Examiner* — Barbara Gilliam
*Assistant Examiner* — Stephan Essex
(74) *Attorney, Agent, or Firm* — Tung & Associates; Damian Porcari, Esq.

(57) ABSTRACT

The level of electrical current produced by a fuel cell during rapid changes in the power demanded by a load, is clamped to the fuel cell's maximum rated current value in order to avoid damage to the fuel cell. When the current supplied to the load by the fuel cell overshoots the maximum rated current value, the fuel cell current is immediately reduced by increasing the fuel cell voltage.

20 Claims, 2 Drawing Sheets

METHOD FOR CONTROLLING FUEL CELL STACK CURRENT

FIELD OF THE INVENTION

This invention generally relates to fuel cell electric vehicles, and deals more particularly with a method for controlling fuel cell current overshoot resulting from transient load demands, such as those produced by vehicle acceleration and deceleration.

BACKGROUND OF THE INVENTION

Fuel cell electric vehicles broadly employ four major power components: a fuel cell system (FCS), an energy storage system (ESS) such as battery pack, a DC/DC converter (DC/DC) and an electric traction motor. During ordinary driving conditions, in order to achieve high fuel economy, the power distribution between the FCS and ESS is scheduled in a manner such that power consumed by the electric traction motor is fully provided by the FCS whenever possible, and the ESS power delivered through the DC/DC converter is scheduled only when the power response of the FCS (which is relatively slow compared to that of the ESS) cannot meet the power demanded by the motor during transient conditions, such as a fast acceleration or regeneration braking. The scheduling of the power distribution between the FCS and ESS described above is sometimes referred to as a load following power control strategy.

During vehicle acceleration, any overshoot of the motor current and power consumption (which is nearly inevitable during ordinary driving conditions) can lead to over-current or over-power of the FCS if the ESS is not able to absorb this overshoot in sufficient time. The fuel cell over-current may damage the FCS, thereby leading to shutdown of the vehicle, or reduce FCS service life.

In order to protect the FCS against damage resulting from over-current/over-power as described above, a control strategy is followed in which a current/power buffer or reserve is set aside when onboard control systems schedule the current/power available for motor use. In other words, less than the maximum FCS current/power capacity is scheduled for actual motor use. Although this buffering technique is helpful in protecting the FCS against the affects of over-current/power, it results in under utilization of the FCS, which is one of the most important components in the fuel cell electric vehicle power system.

Accordingly, there is a need in the art for a control method that regulates current/power in the fuel cell during transient load conditions, which allows maximum FCS current/power to be scheduled for motor use while protecting the FCS against over-current/power. The present invention is intended to satisfy this need.

SUMMARY OF THE INVENTION

According to one aspect of the invention, a method is provided for limiting fuel cell current during transient changes in power demanded by a load. The method comprises the steps of sensing when the level of current used by the fuel cell exceeds a preselected value as a result of a transient change in the power demanded by the load; and, increasing the terminal voltage of the fuel cell in order to reduce the current to below the preselected value when the sensed current exceeds the preselected value. The fuel cell voltage is preferably controlled using a PID controller when the fuel cell current overshoots the maximum rated current level for the fuel cell. Additionally, power requested from an energy storage system, such as a battery pack, is increased using a first order controller to avoid a slow decrease of the fuel cell voltage resulting from the increase in actual power supplied by the ESS.

According to another aspect of the invention, a method is provided for controlling power supplied to an electric vehicle traction motor from a fuel cell and an electrical energy storage system. The method comprises the steps of sensing when the current supplied to the motor by the fuel cell overshoots the maximum rated fuel cell current in response to a transient power demand; reducing the fuel cell current in response to the current overshoot by increasing the fuel cell voltage; and, increasing the power requested to be supplied by the electrical energy storage system when the fuel cell current is reduced. The fuel cell voltage is preferably increased using a PID controller. The method also includes producing a control signal representing the value of the current overshoot and controlling the PID using this control signal. The method may further include the steps of generating a power request signal using a first order controller and using the power request signal to increase the power supplied to the motor by the energy storage system when the fuel cell current is reduced.

According to still another aspect of the invention, a method is provided for clamping the level of electrical current produced by a fuel cell used to power an electric vehicle traction motor during rapid changes in the power demanded by the motor. The method includes the steps of sensing when the current supplied to the motor by the fuel cell overshoots the maximum rated fuel cell current in response to a rapid power demand change; reducing the fuel cell current in response to the current overshoot by increasing the fuel cell voltage; and, increasing the power requested to be supplied by the electrical energy storage system when the fuel cell current is reduced following a current overshoot.

An important advantage of the invention is that the FCS is protected from the affects of current overshoot, while allowing the FCS to operate at its maximum rated current. Accordingly, the need for a current/power buffer held in reserve is unnecessary. Motor power demands occurring during transient conditions which exceed the capacity of the FCS are satisfied by drawing additional power from the ESS.

These non-limiting features, as well as other advantages of the present invention may be better understood by considering the following details of a description of a preferred embodiment of the present invention. In the course of this description, reference will frequently be made to the attached drawings.

DETAILED DESCRIPTION OF THE PREFERRED EMBODIMENT

Figure 1:
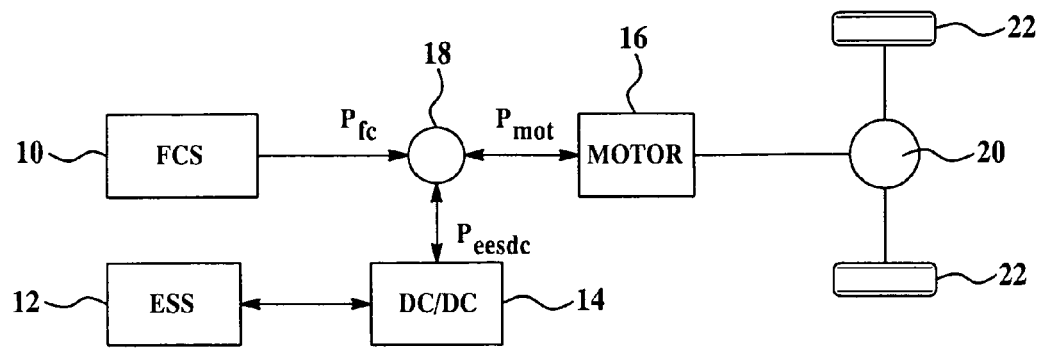
FIG. 1 is a combined block and diagrammatic view of the major components of a power system for a fuel cell electric vehicle.

Referring first to FIG. 1, a fuel cell electric vehicle (FCEV) broadly comprises a fuel cell system (FCS) 10, an energy storage system (ESS) 12, a DC/DC converter 14 and a DC electric traction motor 16. Motor 16 delivers power through a differential 20 to a pair of traction wheels 22 on the vehicle. The ESS 12 typically comprises a bi-directional electrical energy storage system such as a rechargeable battery pack. DC/DC converter 14 is also bi-directional and functions to step-up the voltage supplied by the ESS 12 to a primary operating voltage, typically up to 400 volts DC. DC/DC converter 14 must be bidirectional because the high voltage bus to which it is connected can be used as a current load during startup or as a generator.

Power $P_{mot}$ to the motor 16 is derived either from DC power $P_{fc}$ sourced from the FCS 10 or DC power $P_{ess}$ sourced from the ESS 12. Under ordinary driving conditions, in order to achieve higher fuel economies, the power sourced from the FCS 10 and ESS 12 which is used to power the motor 16 is distributed and scheduled in a manner such that the power requirements for the motor 16 are sourced from the FCS 10 wherever possible, and power derived from ESS 12 through converter 14 is scheduled and used only when the power response of the FCS 10 (which is relatively slow compared to that of the ESS 12) cannot meet the power demanded by the motor 16 which typically occurs during transient conditions such as a fast acceleration or regeneration braking. This power distribution and scheduling technique is sometimes referred to as a load following power control strategy.

Figure 2:
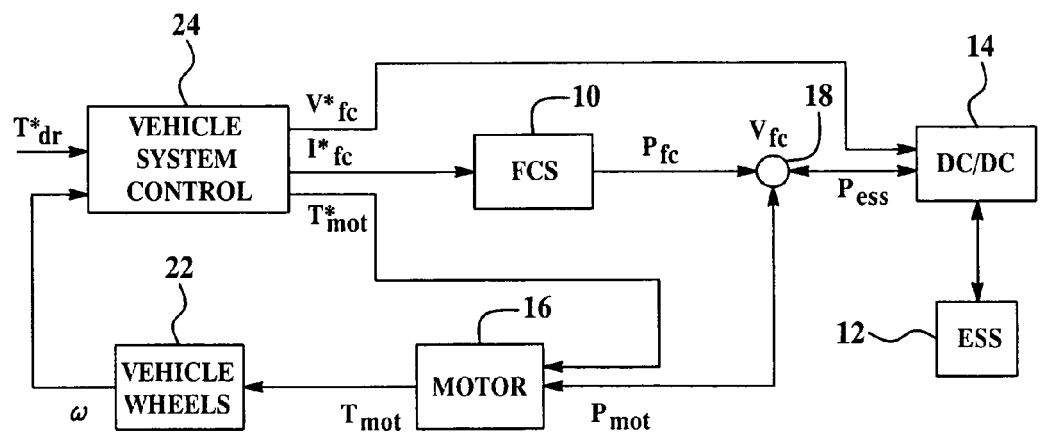
FIG. 2 is a block diagram showing the control signals used to control the components in the power system shown in FIG. 1.

Reference is also now made to FIG. 2 which depicts the control signals used to schedule and distribute power in the system shown in FIG. 1. Throughout the remaining description and the accompanying drawings, the following convention shall be used:

$I^*_{fc}$ fuel cell current command
$I_{fc}$ actual fuel cell current
$P_{fc}$ actual fuel cell output power
$P^*_{ess}$ ESS power request thru DCDC ("+"=discharging, "−"=charging)
$P_{ess}$ actual power flow from ESS thru DCDC ("+"=discharging, "−"=charging)
$P^*_{mot}$ motor power request ("+"=motoring, "−"=generating)
$P_{mot}$ actual motor power consumption ("+"=motoring, "−"=generating)
ωactual wheel speed (radians per second)
$T^*_{dr}$ driver's torque command
$T^*_{mot}$ motor output torque command ("+"=motoring, "−"=generating)
$T_{mot}$ actual motor output torque ("+"=motoring, "−"=generating)
$V^*_{fc}$ fuel cell terminal voltage command
$V_{fc}$ actual fuel cell terminal voltage The total actual power consumed by the motor 16 is equal to the combined actual power supplied by the FCS 10 and ESS 12, or, using the convention defined above:

$$P_{fc} + P_{ess} = P_{mot}$$

For purposes of the present description, any electrical loads supplied by the high voltage bus $V_{fc}$ other than the motor 16, such as power steering, air conditioning, thermal systems, etc. that are not specifically shown in FIGS. 1 and 2, are considered as being consolidated into the load represented by $P_{mot}$. The various components of the power system are controlled by a vehicle control system 24 which produces three control signals $V^*_{fc}$, $I^*_{fc}$ and $T^*_{mot}$ that are dependent on two input signals. These input signals comprise the driver torque command $T^*_{dr}$ and the rotational speed ω of the vehicle's wheels 22.

The first control signal produced by control system 24 comprises the commanded fuel cell terminal voltage $V^*_{fc}$ which is delivered to the converter 14. The second control signal comprises a commanded fuel cell current $I^*_{fc}$ which is delivered to the FCS 10. The third control signal comprises a commanded motor output torque $T^*_{mot}$ which is delivered to the electric motor 16. The power $P_{ess}$ supplied by the ESS 12 is dependent upon the value of the commanded fuel cell voltage signal $V^*_{fc}$. As previously mentioned, the total amount of power $P_{mot}$ delivered to motor 16 on the high voltage bus 18 comprises the sum of the actual fuel cell output power $P_{fc}$ and the actual power $P_{ess}$ derived from the ESS 12 through the converter 14. The actual motor torque $T_{mot}$ delivered to the vehicle wheels 22 from the motor 16 is thus dependent on the total amount of power available to the motor 16 and the value of the commanded motor output torque $T^*_{mot}$.

Figure 3:
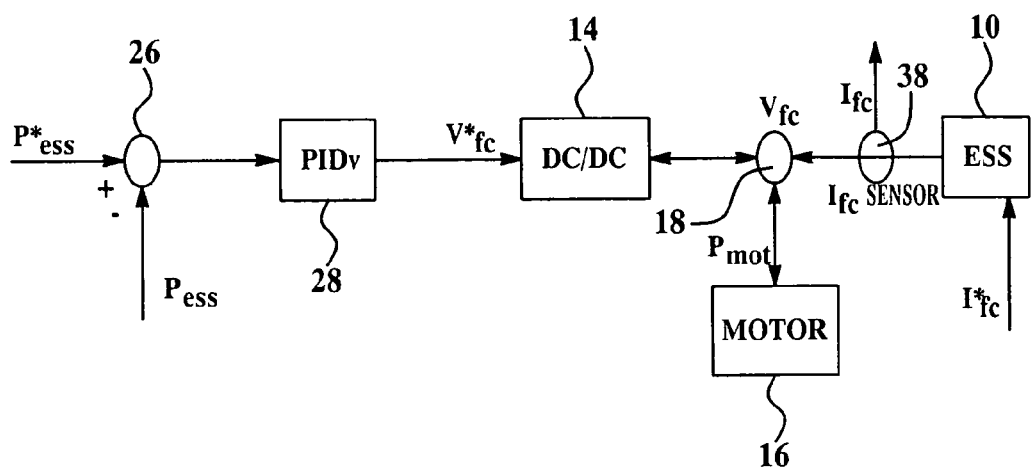
FIG. 3 is a block diagram useful in explaining the power management and current control used in the power system shown in FIG. 1.

Attention is now directed to FIG. 3 which shows how power is managed and fuel cell current is controlled. Power $P^*_{ess}$ requested from the ESS 12 is selected so as to maintain a state of charge of the ESS, which may be an electric battery pack (not shown), within a certain range, for example, between 45% and 65% so that the battery pack has a certain amount of remaining capacity for either charging or discharging. The commanded fuel cell current $I^*_{fc}$ is calculated based upon the ESS power request $P^*_{ess}$, the motor power request $P^*_{mot}$ and the fuel cell voltage $V_{fc}$. The motor power request $P^*_{mot}$ is determined based on the value of the torque command $T^*_{dr}$ as well as the vehicle wheel speed ω. The net difference between the actual and requested power flow from the ESS 12 is input at 26 to a PIDv (proportional integral derivative) controller 28. PIDv controller 28 functions to regulate the actual ESS power $P_{ess}$ at a set level by controlling the fuel cell voltage $V_{fc}$. This is accomplished by the PIDv 28 delivering a commanded fuel cell voltage $V^*_{fc}$ to the converter 14. Generally, for a given motor power consumption $P_{mot}$, the higher the fuel cell voltage $V_{fc}$, the lower the fuel cell current $I_{fc}$, the lower the FCS 10 output power $P_{fc}$, and the higher the actual ESS power $P_{ess}$. Thus, it can be appreciated that the fuel cell current $I_{fc}$ and the power distribution between the FCS 10 and the ESS 12 can be controlled by controlling the fuel cell voltage $V_{fc}$, at 18. In order to control the fuel cell voltage $V_{fc}$, it is necessary to provide a current sensor 38 which senses the current $I_{fc}$ supplied to the motor 16 by the FCS 10.

Figure 4:
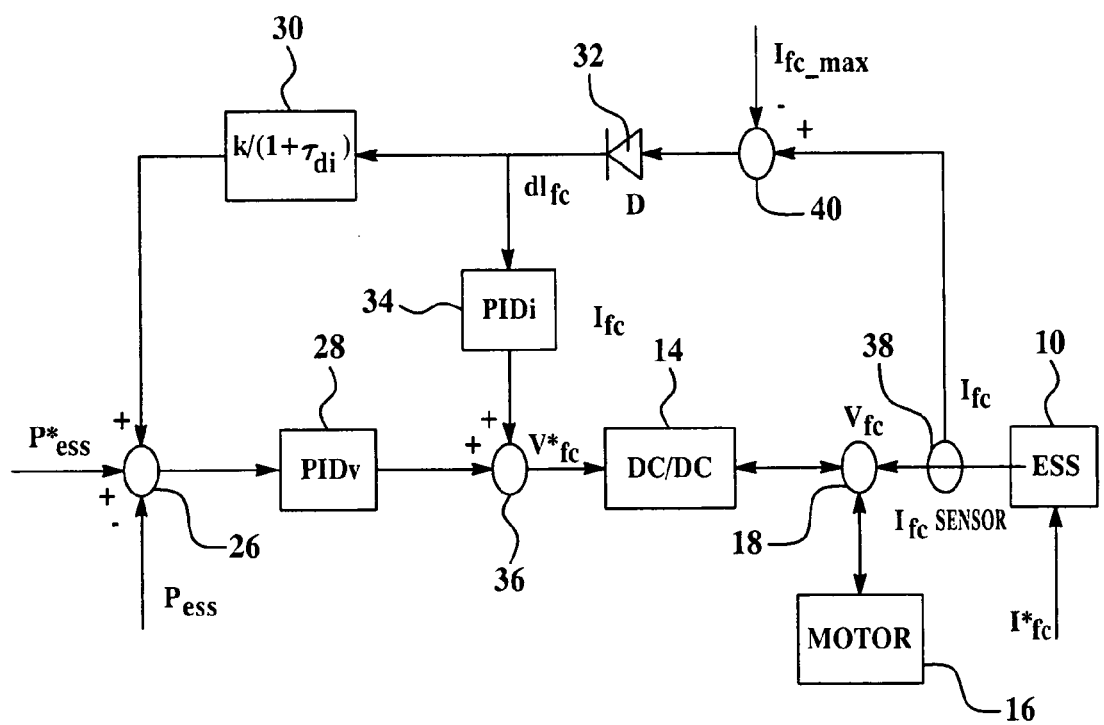
FIG. 4 is a block diagram of a power system for a fuel cell electric vehicle employing a method for controlling fuel cell current in accordance with the preferred embodiment of the invention.

As previously discussed, during rapid vehicle acceleration or deceleration, overshoot of the actual motor current/power used can result in the FCS 10 exceeding its rated current/power level, causing possible damage to or shutdown of the FCS 10. In accordance with the present invention, however, potential damage to the FCS 10 due to current overshoot is avoided without the need for providing a current level buffer that would otherwise prevent the FCS 10 from operating at its maximum rated level. Referring to FIG. 4, in accordance with the present invention, a method is provided for clamping or limiting the fuel cell stack current at its maximum rated value during transient conditions (acceleration or deceleration) while scheduling the maximum FCS current/power available for motor use. As a result, the FCS current/power capability is fully utilized while the FCS 10 is protected against potential damage or reduction of service life.

In connection with FIG. 4 and the related description, the following convention shall be used:
PIDv PID controller for voltage regulation
PIDi PID controller for fuel cell current clamping
$I_{fc\_max}$ max fuel cell current allowed
$dI_{fc}$ fuel cell current over shoot (>0)

$k/(1+\tau_{di})$ first-order controller for adjusting $P^*_{ess}$ due to increase of $P_{ess}$ during clamping D virtual diode, a software logic for positive pass thru The actual fuel cell current $I_{fc}$ is sensed by the sensor 38 and is subtracted at 40 from the maximum fuel cell current allowed $I_{fc\_max}$. A signal representing the positive net current value signal is delivered through a virtual diode 32 and is used as a control input to a first order controller 30 and PIDi 34. The input signal to controllers 30, 34 is essentially the fuel cell current overshoot $dI_{fc}$. The first order controller 30 functions to adjust the requested ESS power $P^*_{ess}$ due to the increase of the actual ESS power $P_{ess}$ during the current clamping process. The virtual diode 32 passes only signals having a positive value, i.e. a current overshoot. The PIDi 34 functions as a controller to clamp fuel cell current while, as previously described, the PIDv controller 28 functions to regulate voltage.

As mentioned above, for a given motor power consumption $P_{mot}$, the fuel cell current $I_{fc}$ can be controlled by controlling the fuel cell voltage $V_{fc}$. The higher the fuel cell voltage $V_{fc}$, the lower the fuel cell current $I_{fc}$. In accordance with the method of the present invention, fuel cell current is clamped to avoid an overshoot. Fuel cell current overshoot is quickly cut off by increasing the fuel cell voltage $V_{fc}$ through the operation of PIDi 34 as soon as the fuel cell current $I_{fc}$ overshoots the maximum rated fuel cell current $I_{fc\_max}$. Further, the ESS power requested $P^*_{ess}$ is increased using the first order controller 30 in order to avoid a slow decrease of the fuel cell voltage $V_{fc}$ resulting from the increase of the actual ESS power $P_{ess}$. The increase of the actual ESS power $P_{ess}$ accompanies the decrease of fuel cell current $I_{fc}$ (as well as fuel cell power $P_{fc}$) that is due to the cut off of the fuel cell current overshoot. As a result, fuel cell stack current is clamped at its maximum rated value during transient vehicle operating conditions, while scheduling the maximum FCS current/power available for motor use, without reserving a current/power buffer avoid current overshoot. As a result, the current/power capability of the FCS 10 is fully utilized while protecting the FCS against damage.

It is to be understood that the method, which has been described above is merely illustrative of one application of the principles of the invention. Numerous modifications may be made to the method as described without departing from the true spirit and scope for the invention.

What is claimed is:

1. A method of limiting fuel cell current during transient changes in power demanded by a load, comprising the steps of:
    sensing when the level of current produced by the fuel cell exceeds a preselected value as a result of a transient change in the power demanded by the load, said preselected value a maximum rated value of said fuel cell; and,
    increasing the terminal voltage of the fuel cell to reduce and clamp the current at the preselected value, said clamping when the sensed current exceeds the preselected value and only during said transient change in power demanded by the load.

2. The method of claim 1, wherein the step of increasing the terminal voltage is performed using a PID controller.

3. The method of claim 2, further comprising the steps of:
    producing a differential signal representing the difference between the preselected and sensed values of the fuel cell current, and,
    controlling the PID using the differential signal.

4. The method of claim 1, further comprising the step of increasing the power supplied to the load from an energy storage system when the current produced by the fuel cell is reduced.

5. The method of claim 1, further comprising the steps of:
    supplying power to the load from an energy storage system;
    generating a power request signal using a first order controller; and,
    using the power request signal to increase the power supplied to the load from the energy storage system when the current produced by the fuel cell is reduced.

6. The method of claim 5, wherein the step of increasing the voltage is performed using a PID controller.

7. The method of claim 6, further comprising the steps of:
    producing a differential signal representing the difference between the preselected and sensed values of the fuel cell current, and,
    controlling the PID using the differential signal.

8. A method for controlling power supplied to an electric vehicle traction motor from a fuel cell and an electrical energy storage system, comprising the steps of:
    sensing when the current supplied to the motor by the fuel cell overshoots the maximum rated fuel cell current in response to a transient power demand;
    reducing the fuel cell current in response to the current overshoot to clamp the fuel cell current at the maximum rated fuel cell current by increasing the fuel cell voltage, said clamping only during said transient power demand; and,
    increasing the power requested to be supplied by the electrical-energy storage system when the fuel cell current is reduced.

9. The method of claim 8, wherein the fuel cell voltage is increased using a PID controller.

10. The method of claim 9, further comprising the steps of:
    producing a control signal related to the value of the current overshoot, and,
    controlling the PID using the control signal.

11. The method of claim 8, including the steps of:
    generating a power request signal using a first order controller; and,
    using the power request signal to increase the power supplied to the motor by the energy storage system when the fuel cell current is reduced.

12. The method of claim 11, further comprising the step of producing a control signal related to the value of the current overshoot, and using the control signal to control the first order controller.

13. The method of claim 8, wherein current sensing step includes:
    sensing the current supplied from the fuel cell, and
    producing a fuel cell current overshoot signal by subtracting the sensed current supplied from the fuel cell from the fuel cell's maximum rated current.

14. The method of claim 13, wherein the fuel cell voltage is increased using a controller operated by the fuel cell overshoot signal.

15. A method of clamping the level of electrical current produced by a fuel cell used to power an electric vehicle traction motor during rapid changes in the power demanded by the motor, comprising the steps of:
    sensing when the current supplied to the motor by the fuel cell overshoots the maximum rated fuel cell current in response to a rapid power demand change;
    reducing the fuel cell current in response to the current overshoot by increasing the fuel cell voltage to clamp the fuel cell current at the maximum rated fuel cell current, said clamping only during said cower demand change; and, providing power to the motor from an electrical energy storage system on-board the vehicle when the fuel cell current is reduced following a current overshoot.

16. The method of claim 15, wherein the current sensing step includes:

sensing the value of the current output from the fuel cell, and subtracting the value of the current flowing from the fuel cell from the maximum rated fuel cell current.

17. The method of claim 15, wherein the step of reducing the fuel cell current includes:

generating an overshoot signal related to the value of the current overshoot, feeding back the overshoot signal as an input to a controller, and using the controller to increase the fuel cell voltage.

18. The method of claim 15, wherein the fuel cell voltage is increased using a PID controller.

19. The method of claim 15 including the steps of;

generating a power request signal using a first order controller; and, using the power request signal to control the power supplied to the motor by the energy storage system when the fuel cell current is reduced in response to an overshoot.

20. The method of claim 15, further comprising the steps of:

generating a power request signal using a first order controller;

using the power request signal to increase the power supplied to the motor by the energy storage system when the fuel cell current is reduced; and, producing a control signal related to the value of the current overshoot for controlling the first order controller.

* * * * *